No. 745,258. PATENTED NOV. 24, 1903.
F. M. STEADMAN.
SIGHTING DEVICE FOR CAMERAS.
APPLICATION FILED JUNE 11, 1903.
NO MODEL.
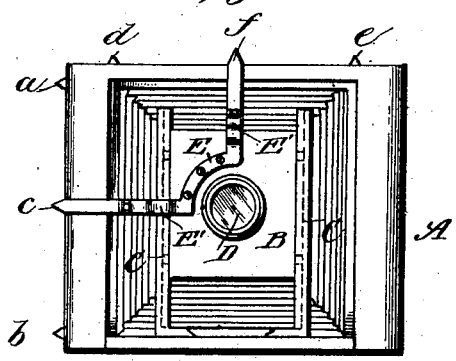
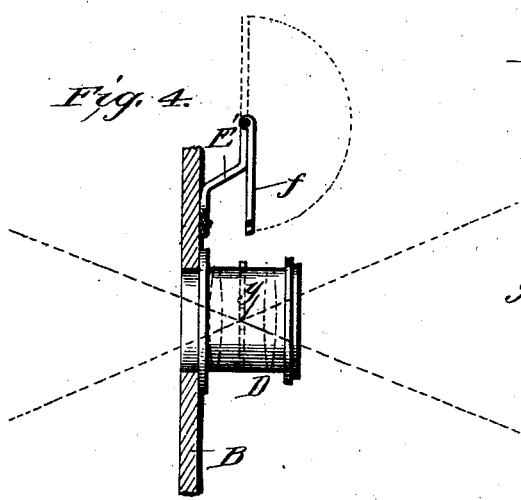
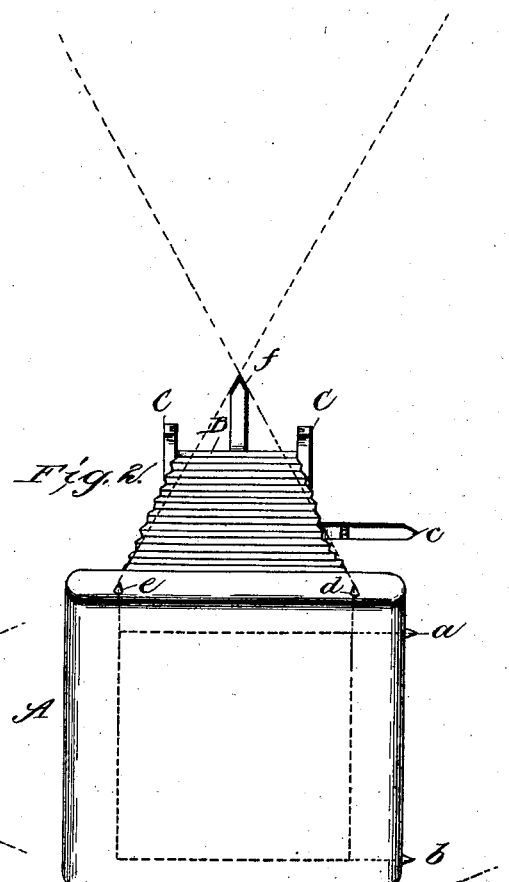
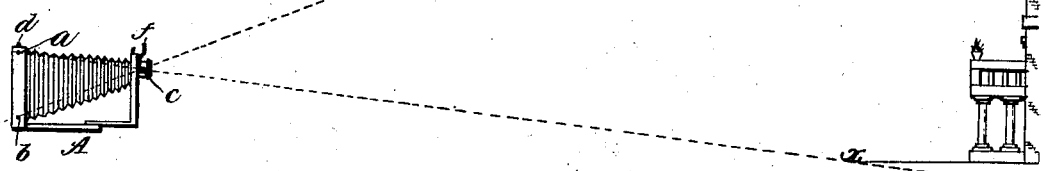
WITNESSES:
INVENTOR
Frank M. Steadman
BY Munn & Co.
ATTORNEYS.

No. 745,258. Patented November 24, 1903.

UNITED STATES PATENT OFFICE.

FRANK M. STEADMAN, OF PUEBLA, MEXICO.

SIGHTING DEVICE FOR CAMERAS.

SPECIFICATION forming part of Letters Patent No. 745,258, dated November 24, 1903.

Application filed June 11, 1903. Serial No. 161,053. (No model.)

*To all whom it may concern:*

Be it known that I, FRANK M. STEADMAN, a citizen of the United States, residing in the city of Puebla, in the State of Puebla, Republic of Mexico, have invented a new and useful Improvement in Sighting Devices for Cameras, of which the following is a specification.

My invention is in the nature of a sighting device for ascertaining exactly what confronting objects strike the image plane or for locating the image properly on the image plane without looking on the ground glass to do so.

The device is especially adapted to film-cameras with which it is impossible to use the ground glass, but is applicable to all cameras.

This improvement is based on the truth that with all lenses which are practically rectilinear, as are nearly all the modern lenses, the optical center of the lens is exactly between any certain point out in front of the lens and the image of that point on the image plane.

My invention comprises one or more sights located on the lens and movable with it and disposed in the plane of the optical center of the lens, combined with sights located on the side of the camera in the image plane and on opposite sides of the same, the lens-sight being made adjustable, so as to be contained within the camera when folded and yet be extensible, so as to come out to the plane of the side sights of the image plane, whereby the sides of the diverging angle extending from the lens-sight to the two side sights at opposite sides of the image plane will constitute sighting-lines which will at once to the eye indicate the field in front, which is in position to be exposed on the sensitive plate by a quick, easy, and external observation.

Figure 1 is a front view of the camera with the sights applied. Fig. 2 is a perspective view from the rear of the camera, showing the alinement of the sights for indicating the horizontal distance of the field included within the range of exposure to the plate or film. Fig. 3 is a side view showing the alinement of the sights for indicating the top and bottom limits of the field included within the range of exposure to the plate or film; and Fig. 4 is an enlarged side view of the lens, showing the coincidence of the top sight with the plane of the optical center of the lens.

A represents any camera having its lens D carried by a plate B, adjustable vertically in the guides C C. On the lens-plate is secured a curved metal plate E, having extensions E' E' at right angles to each other, to which extensions are hinged the sights $c$ and $f$, which are capable of being folded inwardly within the camera-case when it is closed or may be extended so as to project out a little beyond the sides of the camera-case. The extensions E' of the plate E are bent or offset from the lens-plate B, so as to cause the sights $c$ and $f$ to occupy a position exactly in a plane passing through the optical center $y$ of the lens, as seen in Fig. 4.

On the rear external edges of the camera are located the sights $a$, $b$, $d$, and $e$, all of which are in the plane of the sensitive plate or the image plane. Of these sights $a$ and $b$ are on the side of the camera and coöperate with the lens-sight $c$, while $d$ and $e$ are on the top of the camera and coöperate with the lens-sight $f$.

$a$ and $b$ are the sights for locating the top and bottom edges of the outer picture-field, which will strike the image plane at its top and bottom edges. These sights are placed on the side of the camera, one in a direct line with the top of the image plane and the other in line with the bottom of that plane. The other sight $c$ is on the same side of the center of the lens and extending out from it far enough to come in the plane of the side of the camera on which the image plane sights $a$ and $b$ are located.

Fig. 3 shows in side view the location of the above three sights, and the dotted lines show their simple and true relation to the outer picture-field in front of the lens. With these sights the lens may be raised for photographing tall objects, and as the lens-sight $c$ travels up and down with the lens by sighting with the eye over the sights of the image plane and past the lens-sight the exact lines may be seen out in the confronting field, which will constitute the top and bottom edges of that part of the field included on the image plane.

It is readily seen from Fig. 3 that the eye can be placed at the sight $a$ and the point $x$ or any other chosen point looked at and considered as the desired lower limit of the picture-field and that by the simple movement of raising the lens its sight may be brought up to that line. The point $x$ therefore will be known to constitute the lower limit of the picture-field that will strike upon the picture plane. Then by applying the eye to sight $b$, alined with $c$, the opposite limit of the field will be indicated. Also in photographing near objects or copying or enlarging the lens-sight always traveling outward from the image plane with the lens will always truly indicate by sighting exactly where the edges of the picture-field are, and such subjects may be as readily located by this method as views and portraits.

The image-plane sights may be simple metal pins driven in at points which are exactly opposite the edges of the picture planes—$a$ and $b$ on one side of the camera for locating the top and bottom limits of the picture-field, and $d$ and $e$ on top of the camera for locating the right and left margins of that field. The use of the former set is illustrated in Fig. 3, and the latter in Fig. 2.

I am aware of the fact that a camera has been provided with a rectangular frame to be adjusted outside the camera-case and coöperating with a sight on the front of the camera, so as to inclose the field which is to appear on the plate, and I make no claim to this arrangement. In my invention there is no complication whatever, nor any alteration of or injury to the cameras already in use, and my attachments may be conveniently and quickly applied to any camera, the rear sights being mere tacks, which do not mar the instrument nor render it expensive and cumbersome, but, on the other hand, may project sufficiently to lend some protection to the case. The lens-sights are applicable to any lens and when not in use are quickly folded within the limits of the case, so as to be fully inclosed and protected thereby.

Having thus described my invention, what I claim as new, and desire to secure by Letters Patent, is—

1. A lens-sight for a camera, comprising a plate having right-angular extensions provided with adjustable end pieces forming sights substantially as and for the purpose described.

2. A lens-sight for a camera comprising a plate having right-angular extensions with hinged and folding sights on the ends thereof substantially as and for the purpose described.

3. A camera having on one of its sides near its rear edge, and in the image plane, a pair of permanent and stationary sight-points and having also a lens with an adjustable point mounted thereon in a plane passing through the optical center and means by which said adjustable point may be extended out to the plane of the rear sights or be folded within the camera-case substantially as and for the purpose described.

4. A camera having on two of its sides near its rear edge and in the image plane a pair of permanent and stationary sight-points and having also a lens with two adjustable sight-points mounted on the same and projecting at right angles to each other and arranged in a plane passing through the optical center and means by which said adjustable points may be extended out to the plane of the rear sights or be folded within the camera-case substantially as and for the purpose described.

FRANK M. STEADMAN.

Witnesses:
EDW. W. BYRN,
SOLON C. KEMON.